US010062019B2

(12) United States Patent
Mach et al.

(10) Patent No.: US 10,062,019 B2
(45) Date of Patent: Aug. 28, 2018

(54) METHOD, DEVICE AND COMPUTER PROGRAM PRODUCT FOR PROCESSING PRINT DATA TO GENERATE A PRINT IMAGE ON A PRINT SUBSTRATE

(71) Applicant: Océ Printing Systems GmbH & Co. KG, Poing (DE)

(72) Inventors: Cam Hung Mach, Erding (DE); Robert Wallner, Neuried (DE); Adelheid Wiringer, Heldenstein (DE)

(73) Assignee: Océ Printing Systems GmbH & Co. KG, Poing (DE)

( * ) Notice: Subject to any disclaimer, the term of this patent is extended or adjusted under 35 U.S.C. 154(b) by 0 days.

(21) Appl. No.: 15/365,519

(22) Filed: Nov. 30, 2016

(65) Prior Publication Data

US 2017/0154249 A1     Jun. 1, 2017

(30) Foreign Application Priority Data

Dec. 1, 2015   (DE) .......................... 10 2015 120 841

(51) Int. Cl.
*G06F 3/12*     (2006.01)
*G06K 15/02*    (2006.01)

(52) U.S. Cl.
CPC ....... *G06K 15/1819* (2013.01); *G06K 15/022* (2013.01); *G06K 15/1809* (2013.01); *G06K 15/1813* (2013.01); *G06K 15/1823* (2013.01)

(58) Field of Classification Search
CPC ............. G06K 15/1819; G06K 15/022; G06K 15/1809; G06K 15/1813; G06K 15/1823; G06K 15/18; G06F 3/1206; G06F 3/1296; G06F 3/122; G06F 3/126; G06F 3/1211; G06F 3/1229; G06F 3/1243; G06F 3/1247; G06F 3/1285
USPC .......................................... 358/1.1–1.18, 402
See application file for complete search history.

(56) References Cited

U.S. PATENT DOCUMENTS

| 7,469,379 | B2 | 12/2008 | Ducato et al. | |
| 7,835,026 | B2* | 11/2010 | Suzuki | G03G 15/655 358/1.1 |
| 9,081,532 | B2 | 7/2015 | Danner | |
| 2006/0232619 | A1* | 10/2006 | Otsuka | G06K 15/00 347/5 |
| 2012/0127501 | A1* | 5/2012 | Kobayashi | G06K 15/1868 358/1.13 |

(Continued)

FOREIGN PATENT DOCUMENTS

| DE | 19911462 A1 | 9/2000 |
| DE | 10260135 A1 | 7/2004 |

(Continued)

*Primary Examiner* — Gabriel Garcia
(74) *Attorney, Agent, or Firm* — Schiff Hardin LLP

(57) ABSTRACT

Print data generated in a page description language can be processed using a processor. The processing can include checking whether conditions specified in trigger information are satisfied for at least one page of the document and/or for the entire document. Based on the checking, an action associated with the trigger information can be executed that changes the print data. The print data supplied as input print data can be output as output print data after the execution of the action. For example, images, text, barcodes, and/or graphics may be inserted via in the action. Finishing options may also be added, or fonts may be changed.

15 Claims, 2 Drawing Sheets

(56) References Cited

U.S. PATENT DOCUMENTS

2015/0331651 A1   11/2015   Brandl

FOREIGN PATENT DOCUMENTS

| DE | 102005030645 A1 | 1/2007 |
| DE | 102007036986 A1 | 2/2009 |
| DE | 102010036336 A1 | 1/2012 |
| DE | 102014106762 A1 | 11/2015 |

* cited by examiner

METHOD, DEVICE AND COMPUTER PROGRAM PRODUCT FOR PROCESSING PRINT DATA TO GENERATE A PRINT IMAGE ON A PRINT SUBSTRATE

CROSS REFERENCE TO RELATED APPLICATIONS

This patent application claims priority to German Patent Application No. 102015120841.5, filed Dec. 1, 2015, which is incorporated herein by reference in its entirety.

BACKGROUND

To output documents at printing apparatuses, print data can be supplied in a page description language (PDL). The print data can be processed by the printing apparatus and, based on the print data, color separations are generated that then serve for the generation of print images on a substrate material with the aid of a print group of the printing apparatus. Example page description languages include, for example, the Page Command Language (PCL) developed by the Hewlett-Packard Company, Palo Alto, USA; the Post-Script (PS) language developed by Adobe Systems Inc., San Jose, USA; the Advanced Function Presentation (AFP) language used in the high-capacity printing field, including diverse developments such as the Mixed Object Content Architecture (MO:DCA) and the Intelligent Printer Data Stream (IPDS) page description language. The Portable Document Format (PDF), developed by Adobe Systems Inc., can be used to exchange document data between various application programs. To print from databases, the Personalized Print Markup Language (PPML) has been developed by the Print On Demand Initiative (PODi), Rochester, USA.

Due to the multitude of technical environments in the creation, storage, forwarding and output of document data, difficulties often arise in the compatibility, transfer security, data loss and processing speed of different formats at various printing apparatuses and print pre-processing systems. In particular, given printing apparatuses for the printing of continuous substrate material or a continuous recording medium, the printing of substrate material with preprinted forms is very complicated since, given a form change, the substrate material webs (which are often supplied via paper rolls) then must be removed from the printing apparatus and the roll must be exchanged for an additional substrate material roll preprinted with a form. For this, the additional substrate material must be drawn into the printer. Given print data of a page description language that have already been generated by an application, it is also not possible (or is possible only with difficulty) to modify the print image, in particular to insert auxiliary information into the document to be printed. In order to print to preprinted substrate material rolls, print data of multiple print jobs that require the same preprinted substrate material can be collected.

A method and a computer program product for outputting legacy document data organized per page, where legacy document data can include variable document data and tray commands that relate to feed trays of single sheet printers, are described in German Patent Application No. 10 2010 036 336 A1. To print the documents, an established form preprint sheet must respectively be located in the feed trays. To output these print data onto unprinted material, preprint images are superimposed based on the feed trays established in the print data.

A method and a computer program product for converting an input document data stream having at least one document into a structured data file based on a created rule set are described in German Patent Application No. 10 2005 030 645 A1.

A method to determine print resources for the creation of a print image by a printing device, as well as a control unit to control a printing device, are described in German Patent Application No. 10 2014 106 762 A1, in which method and control unit the data volume of print resources is reduced. The print resources are identified with the aid of an identifier, wherein the identifier is dependent on the use data of the print resources. Print resources for the generation of identical print images are thereby reliably identified as identical print resources.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
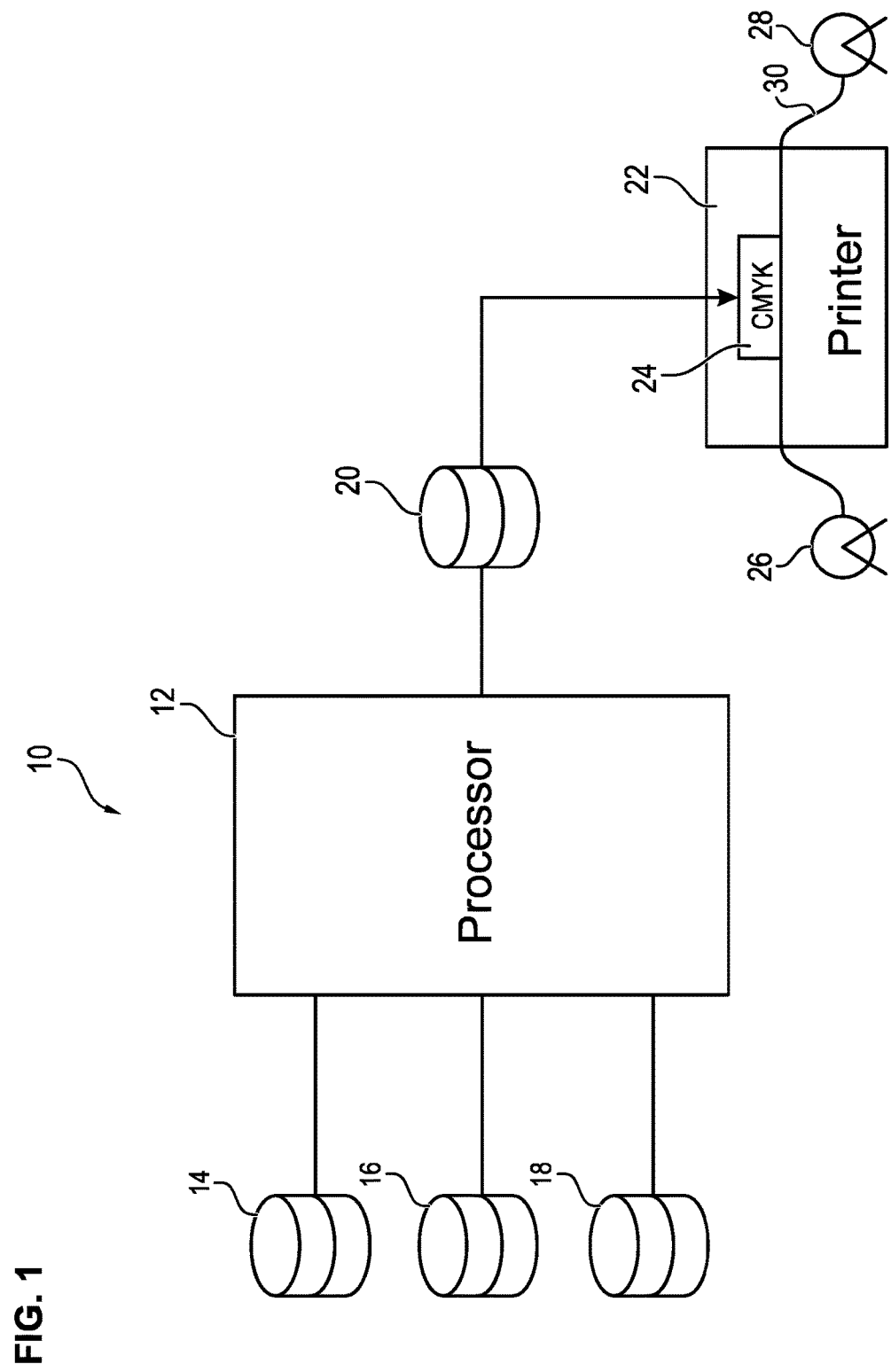
FIG. 1 illustrates a system for processing print data to generate a print image on a substrate material (e.g., a continuous substrate material) with the aid of a printing apparatus according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The disclosure is directed to a method and a device to process print data, with the aid of which method and device a print image can be generated on a substrate material, such as a continuous substrate material. In exemplary embodiments of the present disclosure, input print data are can be provided via a first data source. Data provided via a second data source can include at least one item of trigger information having information about an action to be executed, where the action is associated with the trigger information. The input print data provided from the first data source and the data provided from the second data source can be processed by a data processor. An exemplary embodiment of the present disclosure can include a computer program product for implementation of the method with the aid of the data processor.

It is an object of the present disclosure to provide a method, a device and a computer program product for the processing of print data, via which a simple change or supplementation of a print image to be generated on a continuous substrate material with the aid of these print data is possible.

In exemplary embodiments of the present disclosure, print data present in a page description language may be modified independently of their creation process. For example, a form graphic may be added into individual print pages such that only the variable data are printed into the form during the printing process. In exemplary embodiments, it is possible to print both the form graphic and the variable data onto the continuous substrate material in one printing process, such that preprinted substrate material does not need to be used. In particular, the same substrate material may be used for multiple print jobs with different forms. An exchange of the substrate material stock is thus not necessary before every print job.

In an exemplary embodiment, the continuous substrate material is a continuous paper web that is wound on a roll and is unwound from the roll for printing with the aid of the printing apparatus. For the purpose of this disclosure, a continuous substrate material is any seemingly continuous paper web that can be printed to with continuous printers, for example continuous laser printers or continuous inkjet printers, and does not pertain to single sheets. The seemingly continuous paper web physically has a start and an end, wherein the paper web is separated into multiple single sheets after printing, wherein in particular margins may be separated as waste.

As an alternative to the form graphics that can be added to the input print data with according to exemplary embodiments of the disclosure, other manipulations of the print data or of the print image may take place. For example, arbitrary images or texts may be associated depending on the trigger information and the action to be executed that is associated with said trigger information (i.e., the association is rule-based). In particular, for each print page of a document to be printed with the aid of the input print data, a check can be made as to whether the trigger information is present on this print page and/or whether this print page conforms to the trigger information. After the checking and possible manipulation of the print data for this print page, the manipulated input print data is output per page as output print data. The checking as to whether a print page conforms to the trigger information, and/or whether the trigger information is present on this side, is checked. The checking can be for every print page of the document specified by the input print data.

Via the trigger information, it can be checked as to whether the print page of the document (or the entire document) includes trigger points that correspond to the trigger information. For example, such trigger points may be text included in the print data that are to be unambiguously identified by their print position on a print page or in the document as a whole. Alternatively or additionally, the print data may include metadata or structural elements whose content may be used to identify a trigger point. Such metadata or structural elements may be in, for example, index information, header information in comments, and/or what is known as a no operation instruction (NOOP). A check may thereby be performed as to whether a specific text is present at the determined trigger points (equal_value), any text is located at the determined trigger points (any_value), or the text at the indicated position changes (change_of_value).

As was already noted, at least one action—for example, the aforementioned insertion of forms, the insertion of images, the insertion of text, the insertion of barcodes, the insertion of a graphic (e.g., a line, a box, an ellipse or other graphic elements) and/or the insertion of variable document information (such as page number, sheet number, shipment number, number of the current page, total number of pages, total number of shipments, a print job number, the current data, and/or a shipping data)—may be implemented depending on the information determined at the trigger point. What are known as finishing options may also be added that indicate whether the printed sheets are folded, bound, punched or otherwise post-processed.

The print data supplied as input print data may thus continue to be generated with existing applications. In principle, the achievements according to the exemplary embodiments of the disclosure may be executed independently of a specified target printer. However, details of a target printer may also be taken into account in achievements according to the disclosure. For example, what finishing options the target printing apparatus supports may be taken into account.

Exemplary embodiments according to the disclosure may be used in connection with print data of any known page description language.

Given form printing, in exemplary embodiments of the disclosure, the user no longer needs to have paper rolls produced that are preprinted with forms. Rather, simple, unprinted paper rolls may be used.

In an exemplary embodiment, it is particularly advantageous to select and/or specify the action to be executed based on the trigger information, depending on contents of the print image. For example, an action may be introduced depending on, for example, an invoice amount, an account status information, the gender of the recipient, the gender of a family member mentioned in the document, a tangible good listed on the delivery order or an invoice, a location specified in the document, and/or other information/parameter as would be understood by one of ordinary skill in the relevant arts.

In an exemplary embodiment, the trigger information and/or the action to be executed that is associated with the trigger information, may be established in relation to, for example: the page (e.g., individually for each print page of a document to be printed); the document (e.g., for an entire document); the document type (e.g., for an established document type of the document to be printed); the printer (e.g., at a concrete/specified target printer); and/or globally (e.g., for all print data of any documents). Given multiple established items of trigger information and respective associated actions, individual trigger information may respectively be applied in relation to the page, the document, the document type, the printer and/or globally. Given a trigger information in relation to a page, for example, this may relate to the first page of a document or to the last page of a document, or to an arbitrary other page of a document.

FIG. 1 shows a system 10 configured to process print data according to an exemplary embodiment of the present disclosure. The system 10 can configured to process print data via which a print image can be generated on a substrate material 30 with the aid of a printing apparatus 22 (e.g., a printer) having a print group 24. In an exemplary embodiment, the system 10 includes a data processor 12. The data processor 12 can include processor circuitry configured to perform one or more operations and/or functions of the data processor 12.

In an exemplary embodiment, the data processor 12 can be a software module within a print server (not shown) that is executed by one or more processors to cause the processor(s) to perform the operations specified by the data processor 12.

In an exemplary embodiment, the data processor 12 is a spooler in which print jobs to be executed are cached in a memory before they are relayed to the printing apparatus 22. Before relaying the data to the printing apparatus 22, the data can be processed in the spooler 12 in order to manipulate the print data, including for example: change formatting on one or more individual print pages or all print pages of a document, supplement or swap out content, and/or one or more other manipulations as would be understood by one of ordinary skill in the relevant arts. In an exemplary embodiment, supplementations may be additional text information and/or additional graphics and/or images. Information to be replaced may likewise be text, graphics and/or images. Additional objects (e.g., fonts) may also be removed or added. For example, fonts may be replaced.

In an exemplary embodiment, a first data source 14 is configured to provide print data for generating a print image in a page description language. This print data (referred to as input print data hereafter) can be previously created by an application program and transferred to the data source 14. The input print data may be archived print data of a print job that has already been created beforehand or that was already printed some time ago and is to be printed again.

In an exemplary embodiment, a second data source 16 includes data with at least one item of trigger information and/or information about an action to be executed that is associated with the trigger information. In an exemplary embodiment, a third data source 18 includes resource data. The resource data can include, for example, format templates, images, graphics, text, fonts and/or other printable objects.

The data sources 14 through 18 can provide the respective data that may be respectively read out from the data processor 12. The data processor 12 can be configured to process the input print data of the print job that are read out from the first data source 12, and the data read out from the second data source 16 with trigger information relevant to the respective print job and with at least one action to be executed that is associated with the respective trigger information.

In an exemplary embodiment, the data processor 12 can be configured to process the input data to check whether the input print data includes at least one item of trigger information. Via the trigger information, the data processor 12 can determine/establish at what point of the print data stream, or at what point of a print page specified by the print data, a content established by the trigger information is present. Based on this determination, the data processor 12 can execute the action associated with the trigger information by the data of the second data source 16. For example, the data processor 12 can process the input print data to check whether the input print data includes the respective trigger information and/or whether conditions established by the respective trigger information is satisfied. In an exemplary embodiment, the data processor 12 can be configured to implement this check for each item of trigger information established in the data of the second data source 16 for the respective page, for the entire document, for the document type, and/or for all documents to be processed.

If an additional resource (for example, an additional font, an additional graphic, an additional image etc.) is required for the action to be executed, the data processor 12 can be configured to read the data of this resource from the third data source 18 and insert it—instead of another resource, or additionally—into the print data of the document to be printed, and generate modified print data. The data processor 12 can output the generated modified print data as output print data, which can be stored in data storage 20. In an exemplary embodiment, the output print data stored in the data storage 20 may be stored both as raster data and/or as print data in a page description language. The page description language of the output print data can coincide with or can be different from the page description language of the input print data.

The output print data stored in the data storage 20 may then be transferred immediately or at a later time to the printer 22. The printer 22 can then—with the aid of the print group 24—generate a print image on the continuous substrate material 30 unrolled from the paper roll 26. After printing to the substrate material 30 with the aid of the print group 24, the substrate material is rolled up on a paper roll 28. The paper roll 28 can then be unrolled in one or more post-processing operations of the continuous substrate material 30. For example, the continuous substrate material can be supplied to a cutter that is configured to generate individual sheets from the continuous substrate material. However, in an exemplary embodiment, printing with the aid of the printing 22 is not absolutely necessary since the print data stored in the data storage 20 may—as an alternative to printing—also be stored, archived, transferred to another location, further processed, and/or be subjected to other analysis and/or processing as would be understood by one of ordinary skill in the relevant arts.

Figure 2:
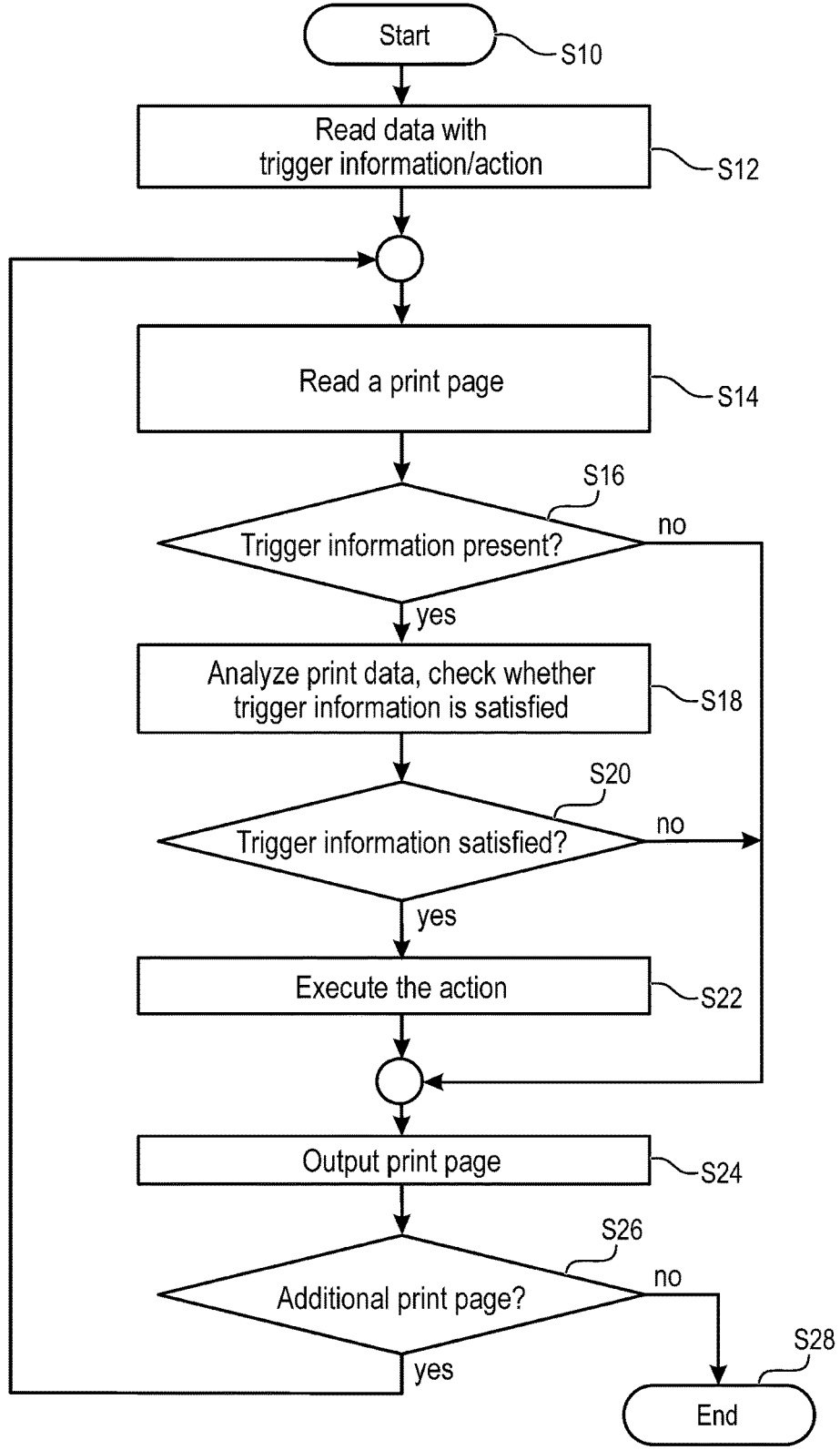
FIG. 2 illustrates a flowchart of a method for processing print data according to an exemplary embodiment of the present disclosure.

FIG. 2 illustrates a flowchart/workflow of a method for processing print data according to an exemplary embodiment of the present disclosure. The flowchart is explained with reference to the system 10 according to FIG. 1. However, the method may also be implemented with other alternative systems.

The flowchart begins at step S10 and transitions to step S12. In step S12, data having at least one item of trigger information and/or at least one action associated with trigger information are read out from the second data source 16 by the data processor 12.

In step S14, the data associated with a first print page are subsequently read from the input print data provided by the first data source 14, and a check (e.g., by the processor 12) is made as to whether a previously imported/read trigger information is to be applied to this print page. The application of the trigger information may be made based on whether the document to be printed is a document of a specific document type, whether it is a previously specified concrete document to which the trigger information or a portion of the trigger information is to be applied, and/or whether the trigger information is to be applied to every print page or only to selected print pages of the document. In an exemplary embodiment, the trigger information may also be selected based on a printer provided for printing the document. In this example, the printer is established before the processing for the print data or the document to be printed. However, in an exemplary embodiment, only output print data that may then be immediately further processed, or are cached (for example in a storage 20) for additional processing at an arbitrary later point in time, are generated with the aid of the method.

In step S16, a check (e.g., by the processor 12) is subsequently made as to whether at least one item of the trigger information is to be applied to the current print page to be processed. If trigger information is not present (No at step S16), the workflow continues to step S24 and the print data with regard to this print page are added to the output print data stored in storage 20. However, if it is established in step S16 that at least a portion of the trigger information is to be applied to the current print page, an analysis of the print data of the current print page is subsequently performed in step S18 (e.g., by the processor 12). In step S20, a check (e.g., by the processor 12) is then made as to whether the requirements specified in the trigger information to be applied are satisfied. If the requirements are not satisfied (No at step S20), the workflow continues to step S24, whereby the print data of this print page are added to the output print data stored in storage 20.

However, if it is established in step S20 that the requirements specified in the trigger information are satisfied, in step S22, the action associated with the respective trigger information is subsequently supplied and the print data of the print page are modified accordingly. In step S24, the output print data stored in the storage 20 are subsequently added.

In step S26, a check (e.g., by the processor 12) is subsequently made as to whether the input print data include print data of at least one additional print page. If so, the workflow returns to step S14. If not (No at step S26), the workflow transitions to step S28 where the workflow/flowchart ends. The method may be repeated for one or more subsequent printing operations.

In an exemplary embodiment, it is particularly advantageous if the input print data are supplied to the data processor 12 as an input print data stream, and output print data is output as an output print data stream.

In an exemplary embodiment, with the aid of the workflow according to the disclosure according to FIG. 2, simple graphics (e.g., company logos) may thus be exchanged; images (e.g., a photo of an account manager) may be added; advertisement information may be supplemented; and/or personal offers to the recipient of the print product may be implemented in said print product.

In an exemplary embodiment, the data stored in the second data source 16, with the trigger information and an action associated with the trigger information, are also designated as a rule set that establishes what action is to be implemented if a page of the document or the entire document satisfies a requirement specified by the trigger information.

For example, a check may be made as to whether the word "Ms." or the word "Mr." is present in the input print data in a defined address region at a specific location of the first page of a document to be printed. If this is the case, the background of the entire document, or only of the first page of the document, may be colored in a first color (e.g., pink) given the presence of the word "Ms." and in a second color (e.g., light blue) given the presence of the word "Mr." A personalization of the document is thereby possible in a simple manner. Additional information—such as information of the subject line—may also be evaluated and used for a personalization. For example, an invoice amount included in the print data may be inserted for the selection of a specified offer to the recipient (e.g., a rebate offer for future purchases). For example, if the document pertains to an account statement, a credit offer may be inserted given a negative balance and an offer for a specific financial investment may be inserted given a positive balance over a specific amount. In particular, background images, overlays, images, text, forms and/or graphics may be inserted with the aid of the action to be executed. The font of the entire document or of portions of the document may also be changed.

In an exemplary embodiment, the image data, text data, graphic data or fonts required to execute the action may be stored in the third data source 18 and be added to the output print data as resources so that they are available upon printing of the print image with the aid of the printing apparatus 22.

With the aid of the described procedure, after the generation of the print data, the print data may be modified at a different location, independently of the applications originally used to create the print data. This is also possible in a print center in which the document should then be printed with the aid of the printing apparatus 22. In particular, in exemplary embodiments of the disclosure, it is no longer necessary to use continuous substrate material 30 having preprinted forms or letterheads. Rather, given the use of a full color printer—such as the printer 22, whose print group 24 prints color separations of the colors (e.g., cyan, magenta, yellow, black (CMYK))—preprinted forms are no longer necessary since these may be printed together with the variable print data onto the non-preprinted substrate material 30 in a single printing process.

In an exemplary embodiment, the trigger information can include an establishment of at least one trigger point that indicates a print position at which a check is made as to whether a specific text, a graphic or an image is to be printed at the print position, and the action associated with the trigger information is executed depending on the element to be printed at the defined print position.

Furthermore, in an exemplary embodiment, a check may be made as to whether metadata or structural elements (for example index information, NOOPs or header data) include specific content data. For example, their content may be used to identify a trigger point. In an exemplary embodiment, a check can be performed to trigger the action with the aid of the trigger information, as to whether: a specific text is found at a trigger point (equal_value); the text changes at the trigger point (change_of_value); and/or any text is located at the trigger point (any_value).

In an exemplary embodiment, form data can be inserted into the print data of a print page (as an overlay, for example) with the aid of the exemplary systems and/or methods. Alternatively or additionally, at least one image, at least one text, barcode(s), graphic, and/or variable document data (e.g., page number, sheet number, shipment number, number of pages, total shipment pieces of a delivery, a priority number or a date) can be added into the print data (and therefore into the print pages to be printed). A finishing option (for example binding, folding, punching, bundling etc.) may also be added for at least one print page or one sheet.

In an exemplary embodiment, the described method may be implemented independently of a target printer 22. The method is applicable to any type of page description language. Modifications of a document to be printed may be implemented automatically via the data contents of the document itself. Trigger information and trigger actions that are created once may be adopted without modification for additional print jobs, or be modified accordingly as necessary.

In an exemplary embodiment, the disclosure conditions are defined with the aid of trigger information. Print data that has already been generated in a page description language are processed with the aid of a data processor (e.g., processor 12), which checks whether the conditions specified in the trigger information are satisfied for at least one page of the document and/or for the entire document. If so, the action associated with the trigger information is executed and the print data are modified via the action. The print data supplied to the data processing unit as input print data can be output as output print data after the execution of the action. Images, text, barcodes, and/or graphics may be inserted in the action, finishing options may be added, and/or fonts may be changed.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, processor circuitry can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hardcoded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

10 system
12 data processor
14, 16, 18 data source
20 storage
22 printing apparatus (printer)
24 print group
26 take-off roller
28 take-up roller
30 paper web
S10 to S28 method steps

We claim:

1. A method to process print data to generate a print image on a continuous substrate material, the method comprising:
   providing an input print data stream by a first data source;
   providing, via a second data source, data having at least one item of trigger information and having information about an action to be executed, the action being associated with the at least one item trigger information;
   processing, by a processor, the input print data stream provided by the first data source and the data provided by the second data source to generate an output print data stream, wherein:
     the processing of the input print data stream includes checking as to whether the input print data includes the at least one item of trigger information or satisfies a condition specified by the at least one item of trigger information, and
     the action associated with the at least one item of trigger information is executed by the processor if the input print data stream includes the at least item of trigger information or the input print data stream satisfies the condition specified by the at least one item of trigger information, and
   outputting, by the processor, the processed input print data stream as the generated output print data stream that is printable to the continuous substrate material.

2. The method according to claim 1, wherein the data having the at least one item of trigger information and having the information about the action to be executed are stored independently of the input print data stream.

3. The method according to claim 1, wherein:
the data provided by the second data source comprises multiple items of trigger information that is respectively associated information about at least one action to be executed,
upon processing the input print data stream for each stored item of trigger information, the method further comprises checking, by the processor, whether the input print data stream includes the respective trigger information, and
the method further comprises executing, by the processor, the action associated with the respective trigger information only when the input print data stream includes the respective trigger information and/or satisfies the condition specified by the trigger information.

4. The method according to claim 1, wherein:
the trigger information and the action to be executed associated with the trigger information are preset relative to: a document, a document type, a printer, and/or globally, and
the method further comprises, before processing the input print data stream, checking whether the trigger information or whether the at least one item of trigger information are to be applied to the respective input print data stream based on the input print data stream.

5. The method according to claim 1, wherein the processing of the input print data comprises:
checking per page whether the respective print page specified in the input print data stream includes the at least one item of the trigger information and/or satisfies the condition specified by the at least one item of trigger information.

6. The method according to claim 1, further comprising:
inserting a resource or a reference to a stored resource by the action into the input print data stream; and
upon insertion of the reference, storing data of the resource in a resource file or in a database.

7. The method according to claim 1, further comprising:
analyzing at least a portion of the input print data stream upon execution of the action,
wherein at least one of multiple possible further actions is executed by the processor based on a content of print images specified by the input print data stream.

8. The method according to claim 7, wherein the execution of the at least one of multiple possible further actions comprises:
inserting one or more items of advertising information, one or more offers, one or more graphics, one or more forms, one or more text elements, one or more fields, and/or one or more images is inserted.

9. The method according to claim 7, wherein the execution of the at least one of multiple possible further actions comprises:
selecting one or more fonts; and
applying the selected one or more fonts to at least a portion of the input print data stream.

10. The method according to claim 1, further comprising:
transferring the output print data stream to a printing apparatus that prints at least one print image to a continuous substrate material based on the output print data stream.

11. The method according to claim 1, wherein the input print data stream comprises document data organized per page and coded in a page description language.

12. The method according to claim 1, wherein:
the at least one item of trigger information comprises a trigger point specifying a location in the print image; and
the checking comprises checking whether the input print data includes the at least one item of trigger information at the specified location.

13. The method according to claim 12, wherein the print data further comprises metadata corresponding to the trigger point that defines one or more characteristics of the at least one item trigger information.

14. A device for processing print data to generate a print image on a continuous substrate material, the device comprising:
a first data source configured to provide input print data stream;
a second data source configured to provide data with at least one item of trigger information and information about an action to be executed, the action being associated with the at least one item of trigger information; and
a data processor that is configured to:
process the input print data stream provided by the first data source, wherein the processing of the input print data stream includes checking whether the input print data stream includes the at least one item of trigger information or satisfies a condition specified by the at least item of trigger information;
process the data provided by the second data source;
execute the action associated with the at least one item of trigger information if the input print data stream includes the at least one item of trigger information or satisfies the condition specified by the at least one item of trigger information; and
output the processed input print data stream as an output print data stream.

15. A computer program product embodied on a non-transitory computer-readable medium comprising program instructions, when executed, causes a processor to perform the method of claim 1.

* * * * *